Oct. 28, 1930.  C. S. BRAGG ET AL  1,779,528
BRAKE MECHANISM
Original Filed June 26, 1924   2 Sheets-Sheet 1
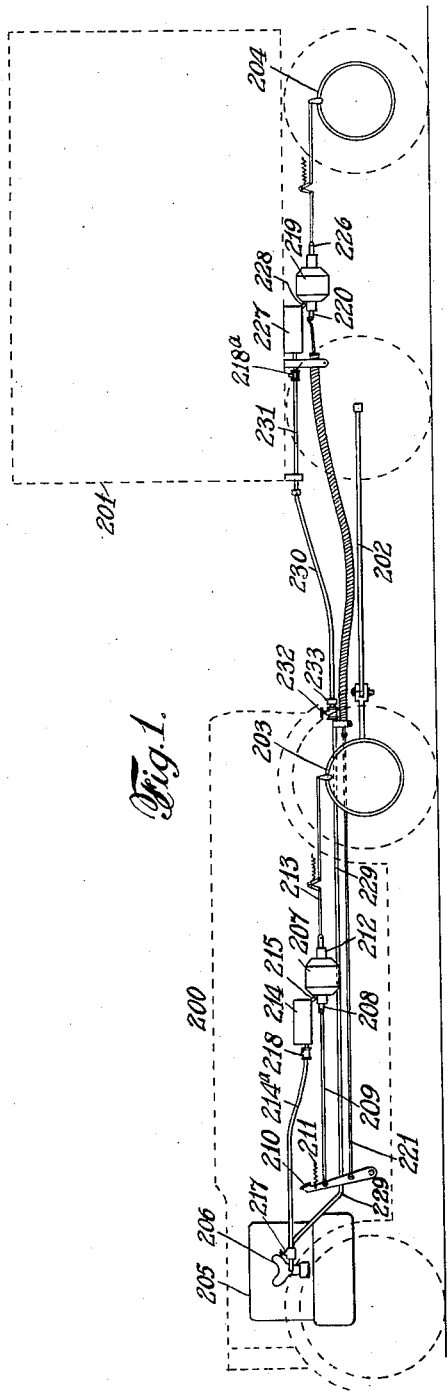
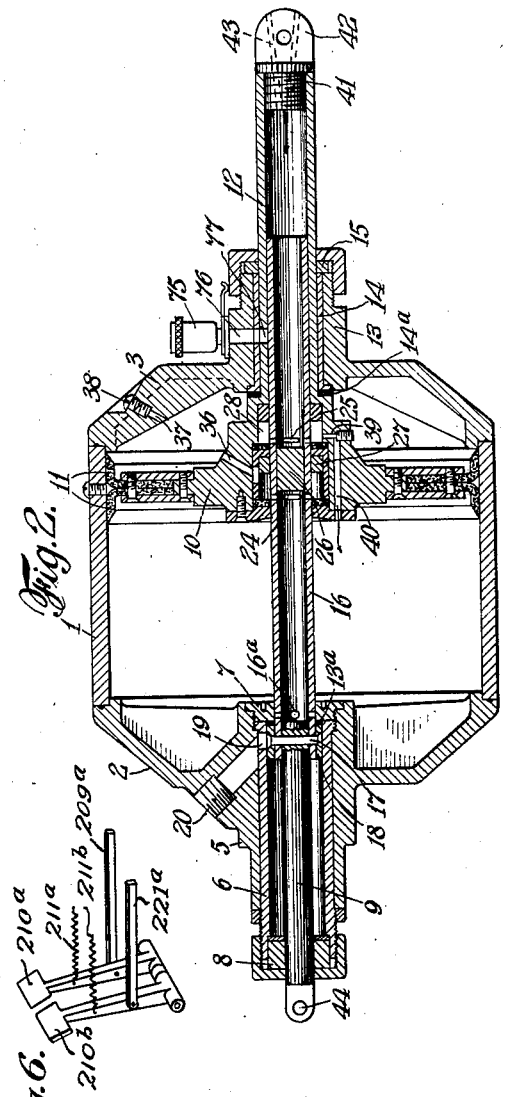
INVENTORS
Caleb S. Bragg and
Victor W. Kliesrath
BY
Louis Prevost Whitaker
ATTORNEY Oct. 28, 1930.   C. S. BRAGG ET AL   1,779,528
BRAKE MECHANISM
Original Filed June 26, 1924   2 Sheets-Sheet 2
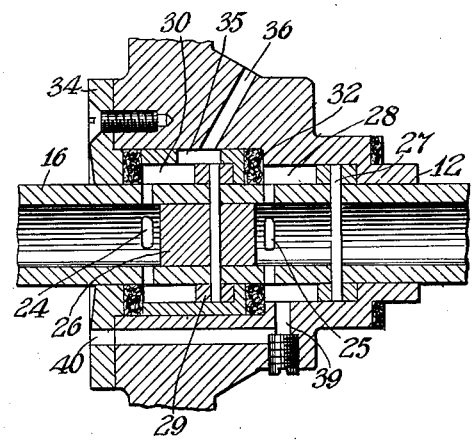
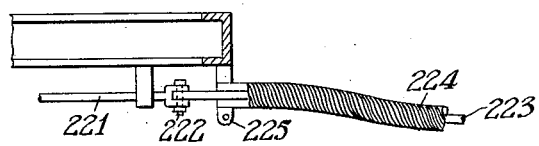

Patented Oct. 28, 1930

1,779,528

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE MECHANISM

Application filed June 26, 1924, Serial No. 722,486. Renewed December 22, 1928.

Our invention consists in the novel features hereinafter described, reference being had to the accompanying drawing which illustrates one embodiment of the same selected by us for purposes of illustration, and the said invention is fully disclosed in the following description and claims.

This application for Letters Patent of the United States is a continuation of our former application filed December 23, 1923, and given Serial Number 682,346, as to all matter common to the two applications.

The object of our present invention is to provide power actuated means for the simultaneous operation of brake mechanism on a main or propelling vehicle, such as an automobile and also upon a separate trailing vehicle operatively coupled thereto and propelled thereby so that the actual operation of the brake mechanism will be effected by power under the most minute manual control as to the extent and direction of movement and degree of applied pressure or force, the manual control operating in the same directions and to substantially the same extent as any ordinary brake installations operating wholly under manual operation, provision being also made for enabling the actuated brake mechanism to be manually operated in the usual direction and to the desired extent under any and all conditions in case of the failure for any reason of the power actuating mechanism, the power for actuating the power actuator of both the propelling vehicle and the trailer or propelled vehicle, being supplied from the main or propelling vehicle, and preferably from the engine, as an internal combustion engine carried thereby, and furnishing the power for propelling both vehicles over the ground. In carrying out our invention we prefer to employ a power actuator on each vehicle, constructed as illustrated, described, and specifically claimed in our former application above referred to, and comprising among its members, a power cylinder, a double acting piston therein movable in both directions by establishing differential pressures on opposite faces of the piston, and reversing valve mechanism by which the higher and lower pressures may be reversed with respect to the piston, the valve mechanism being so constructed as to be capable of bringing the piston into a balanced condition and arresting it in any desired interjacent position between the limits of movement of the valve mechanism with respect to the piston. The valve mechanism is operated by operator operated means, generally included under the term "manually operated means", such as a suitable lever operated by the foot (or by hand), and the valve mechanism is connected with the piston of the actuator by means permitting lost motion so that in case of the failure of the power for any reason the operator may through the manually operated valve mechanism, apply power directly to the piston, and thence to the brake mechanism with which the actuator piston is connected, so that the brake mechanism can be operated efficiently even though the power should fail. In practice the power actuator may be operated in connection with any desired means for establishing differential pressures, as for example, means for producing a partial vacuum such as suction device with or without a vacuum tank may be used for the lower pressure and air at atmospheric pressure may be relied on for the higher pressure, or a compressed fluid, as steam or compressed air above atmospheric pressure, may be relied upon for the higher pressure, working against air at atmospheric pressure, or we may employ compressed motor fluid above atmospheric pressure for the higher pressure, and a partial vacuum produced by suction mechanism for the lower pressure, and in either case storage or equalizing tanks may or may not be employed as desired. Our power actuator is exceptionally well adapted for use in connection with internal combustion engines, which at all times during their operation present differential pressures. Thus, there is a suction produced by the cylinders in drawing in the charges of explosive mixture between the cylinders and the throttle valve which is at its maximum when the engine is throttled down and decreases as the throttle is opened. There is also high compression in the cylinders which is greatest when the throttle is wide open and decreases as the throttle is closed. Our power actuator can therefore be readily operated by suction from the intake manifold or by compressed gases from a cylinder of the engine or by both as preferred. In carrying out our present invention we employ an actuator of the kind referred to on the main or propelling vehicle operated preferably by suction from the intake manifold, of an internal combustion engine, for the low pressure, and atmospheric air for the high pressure, the actuator piston being connected to brake mechanism for the wheels of the main vehicle and the valve mechanism of the actuator being operatively connected to an operator operated, or manually operated device located on the main vehicle. The propelled or trailing vehicle is likewise provided with a separate power actuator operated by suction from the intake manifold on the engine carried by the main vehicle, by means of suitable pipe connections including flexible connections between the vehicles, to furnish the low pressure, and atmospheric air being used for the high pressure, the piston for the auxiliary power actuator being connected to separate brake mechanisms for the wheels of the trailing vehicle, the valve mechanism of the actuator being operatively connected with the operator operated, or manually controlled foot lever or part on the main vehicle, by suitable mechanical connections, including flexible portions extending from one vehicle to another. A suitable vacuum or equalizing tank may be employed in the connections between each actuator and the intake manifold of the engine on the main vehicle in order to maintain the partial vacuum therein and insure the instantaneous response of the actuator when the valve mechanism is operated, a restricting device, preferably in the form of a pipe or passage of small diameter or an adjustable regulating valve for maintaining a limited or restricted communication with the intake manifold being installed between the latter and the equalizing tank. The object of this restricting device is to prevent so great a quantity of air from being suddenly drawn into the intake manifold when the brakes are applied as to stall the engine, while idling with clutch and gear disengaged which would result in preventing further suction and thus fail to operate the brakes. This is particularly important in our present invention in which a plurality of actuator cylinders are employed. At the same time it is desirable that the suction shall act quickly and efficiently when the brakes are applied and this is insured by the equalizing tanks which are connected to the actuator cylinders by pipes or passages of considerable area in cross section, and in which a partial vacuum is maintained at all times, and the restricting device or regulating valve cooperates with the equalizing tanks, the air being exhausted slowly from the tanks so as not to stall the engine, while idling with clutch and gear disengaged while the partial vacuum in the tanks insures the instantaneous action of the power actuators. It follows from this construction that an operator on the main or propelling vehicle can simultaneously operate the valve mechanisms of both power actuators, and thereby apply the brakes of the main vehicle, and also the trailer or propelled vehicle simultaneously, and can also release the brakes of both vehicles simultaneously, thus preventing the trailing vehicle from running ahead and throwing its weight to the propelling vehicle in descending the grades and in bringing both vehicles to a stop. It will also be understood that if for any reason the power should fail, the operator on the main vehicle can actually apply sufficient force to the piston of each actuator to apply the brakes connected therewith, and thus prevent what might otherwise result in a serious accident. It will also be understood that the operation of the operator operated part or foot lever will be in the same direction and to approximately the same extent as in an ordinary brake mechanism, although it normally actuates only the valve mechanism of the power actuators, so that there is no new operation to be learned by the operator, who is nevertheless relieved from the physical exertion of actually applying the brake, while the brakes are under the same minute and delicate control as they would be if directly connected to the operator operated device.

Referring to the accompanying drawing,

Fig. 1 is a diagrammatic view showing the application of our power actuator for operating simultaneously the brakes of an automotive vehicle, and a trailer vehicle propelled thereby.

Fig. 2 is an enlarged sectional view of one of our power actuators, detached showing the parts in normal position.

Fig. 3 is an enlarged detail sectional view of the controlling valve mechanism for the actuator piston.

Fig. 4 is an enlarged detail view of the means including a flexible pipe for connecting the vacuum tank on the trailer with the intake manifold of the engine of the automotive vehicle.

Fig. 5 is a detail view illustrating one form of means for effecting the connection between the brake lever of the automotive vehicle and the actuating part of the motor actuator carried on the trailer.

Fig. 6 is a detailed view showing a modified arrangement of foot lever.

Referring to the drawings, we have shown in Fig. 1, an automobile, indicated at 200, and a trailer indicated at 201, mounted upon independent wheels and connected to the automobile by a detachable coupling bar, 202, in any usual or preferred manner. In this instance we have shown brake mechanism for the rear wheels of the automobile, indicated at 203, and independent brake mechanism for the rear wheels of the trailer, indicated at 204. 205 represents the internal combustion engine for propelling the automobile, provided with the usual intake manifold, 206. The automobile is shown as provided with a power actuator, indicated at 207, constructed and operating as set forth in our former application for Letters Patent of the United States 682,346, the construction of which is illustrated in detail in Figs. 2 and 3. The power actuator comprises the power cylinder, 1, closed at both ends by front and rear heads, 2 and 3 respectively, secured to the cylinder in any desired manner. The forward head, 2, is provided with a guiding sleeve, 5, enclosing a bushing, 6, held in position by an annular guiding ring, 7, at the inner end of the sleeve, the outer end of the sleeve being provided with a stuffing box, 8, through which extends a longitudinally movable valve actuating rod, 9. Within the cylinder, 1, is a double acting piston, 10, provided with gaskets, 11—11. The piston is provided with a tubular extension, 12, or piston rod, which extends through a stuffing box, 13, in the rear cylinder head, 3. 16 represents a longitudinally movable valve sleeve fitting the internal bore of the piston rod, 12, extending through the cylinder and piston and having its forward end operatively connected with the valve actuating rod, 9. This sleeve, 16, is provided with a valve collar, 18, having its exterior surface ground to fit the bushing, 6, and adapted to close a port, indicated at 19, in the bushing, communicating with the passage, 20, leading to the source of lower pressure, as for example in the present instance, the intake manifold, 206, of the internal combustion engine, 205. An annular valve seat, 13ª, is provided at the outer end of the sleeve, 16, and adjacent to the port, 19, which is engaged by the outer face of the collar, 18, to further insure a tight joint when the parts are in normal position. The valve sleeve, 16, is provided in rear of the collar, 18, with a series of ports, 16ª, adapted to be brought into communication with the port, 19, when the valve sleeve is shifted forwardly. The valve sleeve, 16, is provided within the piston with two annular series of openings, indicated at 24—25 respectively, located in different transverse planes and separated by an internally solid portion or plug, 26. The openings, 24, may be termed the lower pressure openings, and the openings, 25, may be termed the higher pressure openings of the valve mechanism. The hub of the piston is provided with separate chambers, 28 and 30, respectively, the chamber, 30, communicating by a passage, 36, with the cylinder in rear of the piston, and the chamber, 28, communicating by the passages, 39—40, with the cylinder forward of the piston. The sleeve, 16, is also provided with annular valve collars, 27 and 29 respectively, fitting the respective chambers, 28 and 30, and capable of being moved therein to an extent equal to the length of said chambers, which in practice is practically $\frac{7}{16}$ of an inch. This construction effects a connection between the valve sleeve, 16, and the piston, permitting lost motion to the extent indicated, so that the movement of the valve sleeve in either direction to the extent of the lost motion permitted, will bring the collars, 27 and 29, into engagement with the piston, and further movement of the valve sleeve, 16, will positively move the piston therewith.

The construction of the actuator is such that in the normal position of the parts indicated in Fig. 2, the low pressure ports, 24, are shut off from the forward portion of the cylinder, and the high pressure ports, 25, establish communication between the forward part of the cylinder and the atmosphere through the passages, 39—40, in the piston, and apertures, 43, communicating with the interior of the hollow piston rod, 12. It will be understood that if the valve sleeve, 16, is moved forwardly or to the left in Figs. 2 and 3, the low pressure ports, 24, will be withdrawn from the piston chamber, 30, and brought into communication with the cylinder forward of the piston while the high pressure ports, 25, will be moved into communication with the chamber, 30, thus placing the portion of the cylinder in rear of the piston in communication with the atmosphere, and the suction of the engine manifold will immediately cause the piston to move forwardly until it closes the ports, 24 and 25, when the piston will be brought into a balanced condition and will remain so long as the valve mechanism is not moved. A further forward movement of the valve mechanism will be followed by similar forward movement of the piston, and on the contrary, the rearward movement of the valve sleeve will carry the ports into positions indicated in Fig. 3, the low pressure ports, 24, being brought into communication with the chamber, 30, and thereby into communication with the cylinder in rear of the piston, while the high pressure ports, 25, will be brought into communication with the chamber, 28, thereby admitting atmospheric air to the cylinder forward of the piston and causing the piston to be immediately retracted until the ports, 24—25, are closed, when the piston will be brought into a balanced condition. It will be understood that in the operation of our improved power actuator the movement of the reversing valve mechanism will be effected by the foot lever, or other operator operated part, and will control the movement of the piston, and the brake mechanisms operatively connected therewith as to direction and extent of movement with the same delicacy and accuracy as if the power to operate the brakes was directly applied by the operator.

As shown in Fig. 1, the main vehicle or automobile and the trailer are each provided with a power actuator of the kind described, and indicated at 207, and 219, respectively, both of which are connected with the intake manifold by suitable pipe connections. In order to insure the quick actuation of the brakes we prefer to provide each actuator with an equalizing tank, the actuator, 207, being provided with the tank, 214, to which it is connected by a pipe, 215, of considerable diameter, and the actuator, 219, being provided with a tank, 227, to which it is connected by a similar pipe, 228. In order to prevent the influx of so great a quantity of air into the intake manifold as to stall the engine, we provide a restricting device (as a pipe or passage having a restricted opening therethrough, or a suitable adjustable regulating valve) between the intake manifold and the equalizing tanks, 214 and 227. In the drawing, Fig. 1, we have shown such a regulating valve interposed between the intake manifold and the pipe, 214ª, leading to the tank, 214, and the pipe, 229, leading to the tank, 227. This valve (or other suitable restricting device) is so adjusted, while the engine is running idle and fully throttled, that the necessary suction will be provided to operate both power actuators without stalling the engine while idling with clutch and gears disengaged. This is very important, especially where a plurality of actuators are connected to the intake manifold, as otherwise, when the actuators are brought into operation, so much air might be admitted to the engine, which is of course throttled down as the brakes are applied, that the engine might stall, which would prevent further suction and interfere with the proper application of the brakes of both vehicles by the power actuators. It will be seen that in our construction the tanks, 214 and 227, cooperate with the regulating valve, 217, or other restricting device, in providing for a gradual exhaustion of air from the tanks to produce a partial vacuum therein, so that on the operation of the power actuators the pistons thereof will be quickly and positively operated to apply the brakes, while the partial vacuum is maintained in the tanks without danger of stalling the engine.

The pipe, 229, leading from the restricting device, or adjustable regulating valve, 217, preferably extends to the rear end of the automobile, 200, where it is provided with a cut off valve, 232, and the pipe, 229, is provided with a detachable flexible pipe, 230, connecting it with a pipe section, 231, on the trailer, connected with the tank, 227, so that the flexible pipe, 230, which accommodates the relative movement between the main vehicle and trailer, can be detached from the main vehicle when the trailer is not used, in which case the pipe valve, 232, will be closed. The suction pipes, 214ª and 231, are preferably provided each with a check valve, which valves are indicated at 218 and 218ª in Fig. 1. 210 represents the operator operated part, or foot lever, which is connected by suitable connections with the valve sleeve, 16, of each of the actuators, 207, and 219. In the drawings we have shown the foot lever connected to a link, 209, with the actuating rod, 208, for actuating the valve sleeve, 16, of the main actuator, 207. The brake lever is also connected by a link, 221, which extends to the rear of the automobile where it is connected by a detachable pin, 222 (see Fig. 5), with a flexible wire or rod, 223, extending through a flexible metallic tube, 224, the forward end of which is connected detachably to some part of the frame of the automobile, as by means of a detachable clamp, indicated at 225 (Fig. 5), the flexible rod 223, being connected at its rear end to the actuating rod, 220, for the valve sleeve, 16, of the power actuator, 219, carried by the trailer. This construction permits of the removal of the flexible tube, 224, and the flexible rod, 223, from the automobile when it is desired to separate the trailer therefrom. The flexible rod, 223, and its protecting flexible tube, 224, will accommodate the relative movements of the automobile and trailer with respect to each other while maintaining the proper operative connection between the connected parts. The piston rod of the actuator, here indicated at 212, is shown connected by a link mechanism, indicated at 213, with the brake mechanism 203, for the automobile or propelling vehicle, 220, so that by operating the brake lever, 210, the operator can effect the application of the brakes or the release of the same by means of the power actuator, 207, as before described. The piston rod, 226, of the power actuator, 219, carried by the trailer, is connected to the brake mechanism for actuating the brakes, 204, on the trailer, in any desired manner, or as indicated in Fig. 1.

When the foot lever, 210, is depressed, there will be a simultaneous operation of both actuators, 207 and 219, thereby applying the brakes simultaneously to the wheels on both vehicles to the desired extent and preventing the trailer from throwing its load against the propelling vehicle, in descending a grade or in slowing down, or stopping the vehicles. When the foot lever is released the brake mechanisms of both vehicles will be simultaneously released as the power actuators will operate, in the manner hereinbefore described. It will also be seen that should the power fail for any reason the forward movement of the foot lever will take up the lost motion provided in our valve mechanism between the valve sleeve thereof and the actuator piston, so that the operator, by exerting further pressure on the foot lever can positively apply the brakes by the exertion of the necessary power on the foot lever independently of the actuator mechanism, and thus insure the application of the brake mechanism of both vehicles under all conditions.

In some instances we may employ two foot levers, 210ª and 210ᵇ, arranged side by side, and provided with retracting springs, 211ª, 211ᵇ, as shown in Fig. 6 so that the foot of the operator may be made to engage either or both of said levers, one of the foot levers 210ª being connected by line 209ª to the actuator, 207, and the other foot lever, 210ᵇ, being connected by link, 221ª with the actuator, 219, on the trailer, so that the brakes of the two vehicles can be applied independently or simultaneously as desired. This arrangement will enable the operator, for example, to hold the brakes on the trailer when the vehicles are stopped on an up grade, while releasing the brakes on the main or propelling vehicle to facilitate its starting and getting under way.

What we claim and desire to secure by Letters Patent is:

1. The combination with an automobile provided with an internal combustion engine for propelling the same, and brake mechanism, and a trailing vehicle adapted to be connected with the automobile and provided with independent brake mechanism, of a power actuator operated by differential pressures carried by each of said vehicles and connected with the brake mechanism thereof, fluid pressure connections from each of the power actuators directly to the engine of the automobile for providing at least one of said differential pressures, valve mechanism for controlling each of said power actuators, and operator operated mechanism on the automobile operatively connected with said valve mechanisms for simultaneously controlling both of said actuators to apply and release the brake mechanism of the automobile and trailer.

2. The combination with an automobile provided with an internal combustion engine for propelling the same, and brake mechanism, and a trailing vehicle adapted to be connected with the automobile and provided with independent brake mechanism, of a power actuator carried by each of said vehicles and comprising an actuator cylinder, a piston therein, means for creating differential pressures in the actuator cylinders, on opposite faces of the piston, including a connection from each of said cylinders to the intake manifold of the engine, and reversing valve mechanism constructed to maintain said pistons in a balanced condition, in interjacent positions between the limits of movement of the valve mechanism, a connection between the brake mechanism of each vehicle and the piston of its power actuator, operator operated mechanism carried by the automobile and operatively connected with the valve mechanism of each of said power actuators for effecting the operation thereof.

3. The combination with an automobile provided with an internal combustion engine, for propelling the same, and brake mechanism, and a trailing vehicle connected with the automobile, and provided with independent brake mechanism, of a power actuator carried by each of said vehicles, each comprising a cylinder and piston, an actuated part connected with said piston and operatively connected with the adjacent brake mechanism, means for supplying differential fluid pressures to the actuator cylinder, including an equalizing tank for each actuator operatively connected with the engine, a reversing valve mechanism for each actuator for connecting the equalizing tank thereof to the cylinder on opposite faces of the piston and constructed to maintain a balanced condition of the piston when said valve mechanism is in an interjacent position, connections between the said equalizing tank of the trailer and the engine, including flexible portions between the automobile and trailer, operator operated mechanism on the automobile, and operative connections therefrom to the valve mechanism of each of said power actuators for operating the brakes of both vehicles.

4. The combination with an automobile provided with an internal combustion engine for propelling the same, and brake mechanism, and a trailing vehicle adapted to be connected therewith provided with independent brake mechanisms, a power actuator carried by each of said vehicles, each comprising a power cylinder, a piston working therein, means for establishing differential pressures on opposite faces of the piston for operating it in both directions, including pipe connections from the intake manifold of the engine to each actuator cylinder, and reversing valve mechanism constructed to maintain the piston in balanced condition when in interjacent positions between its limits of movement, and including a movable part operatively connected with the piston by means permitting lost motion, the brake mechanism of each vehicle being connected with the piston of the power actuator therefor, operator operated mechanism on the automobile, and operative connections therefrom to the valve mechanisms of each actuator, whereby on the failure of power the brake mechanisms of both vehicles can be applied by direct pressure on the operator operated mechanism.

5. The combination with an automobile provided with an internal combustion engine for propelling the same, and brake mechanism, and a trailing vehicle adapted to be connected therewith provided with independent brake mechanism, a power actuator carried by each of said vehicles, each comprising a power cylinder, a piston working therein, means for establishing differential pressures on opposite faces of the piston for operating it in both directions, and reversing valve mechanism constructed to maintain the piston in balanced condition when in interjacent positions between its limits of movement, connections between the brake mechanism of each vehicle and the actuator piston thereof, a pipe connection from the actuator of the automobile to the intake manifold of the engine, a pipe connection from the actuator for the trailer to the intake manifold of the engine on the automobile, provided with a flexible portion extending between said vehicles, and detachable from the portion carried by the automobile, a valve for closing the portion of said connection carried by the automobile, an operator operated mechanism on the automobile, connections therefrom to the valve mechanisms of the actuators carried by the automobile and trailer, the connections to the valve mechanism on the trailer including a flexible portion extending between said vehicles, and capable of being disconnected therefrom, and disconnectible traction means for disconnecting said vehicles.

6. The combination with an automobile provided with an internal combustion engine for propelling the same, and brake mechanism, and a trailing vehicle connected with the automobile and provided with independent brake mechanism, of a power actuator carried by each of said vehicles, each comprising a power cylinder and piston, operative connections from each of said actuator pistons to the adjacent brake mechanism, and means for supplying differential fluid pressure to the actuator cylinder, including an equalizing tank for each actuator operatively connected with a cylinder of the engine, each of said power actuators being provided with reversing valve mechanism for connecting the equalizing tank thereof to the cylinder on opposite faces of the piston, and constructed to maintain a balanced condition of the piston when said valve mechanism is in an interjacent position, the connections between the equalizing tank of the trailer and the engine including flexible portions between the automobile and trailer, operator operated mechanism on the automobile, and operative connections therefrom to the valve mechanisms of each of said power actuators for operating the brakes of both vehicles.

7. The combination with an automobile provided with an internal combustion engine for propelling the same, and brake mechanism, and a trailing vehicle connected with the automobile and provided with independent brake mechanism, of a power actuator carried by each of said vehicles, each comprising a power cylinder and piston, operative connections from each of said actuator pistons to the adjacent brake mechanism, means for supplying differential fluid pressures to the actuator cylinders, including connections from each actuator cylinder to the intake manifold of the engine, and to a cylinder of the engine, and a reversing valve mechanism for each actuator controlling said connections and constructed to maintain a balanced condition of the piston when said valve mechanism is in an interjacent position, an operator operated mechanism on the automobile, and operative connections therefrom to the reversing valve mechanism of each of said power actuators for operating the brakes of both vehicles.

8. The combination with an automobile provided with an internal combustion engine for propelling the same, and brake mechanism, and a trailing vehicle connected with the automobile and provided with independent brake mechanism, of a power actuator carried by each of said vehicles, each comprising a power cylinder and piston, operative connections from each of said actuator pistons to the adjacent brake mechanism, means for supplying differential fluid pressures to the actuator cylinder including an equalizing tank for each actuator, and pipe connections therefrom to the intake manifold of the engine, and a reversing valve mechanism for each actuator for connecting the equalizing tank thereof to the cylinder on opposite faces of the piston and constructed to maintain a balanced condition of the piston when said valve mechanism is in an interjacent position, operator operated mechanism on the automobile, and operative connections therefrom to the valve mechanism of each of said power actuators for operating the brakes of both vehicles.

9. The combination with an automobile provided with an internal combustion engine for propelling the same, and brake mechanism, and a trailing vehicle connected with the automobile and provided with independent brake mechanism, of a power actuator carried by each of said vehicles, each comprising a power cylinder and piston, operative connections from each of said actuator pistons to the adjacent brake mechanism, means for supplying differential fluid pressures to the actuator cylinder including an equalizing tank for each actuator, and pipe connections therefrom to the intake manifold of the engine, and a reversing valve mechanism for each actuator for connecting the equalizing tank thereof to the cylinder on opposite faces of the piston and constructed to maintain a balanced condition of the piston when said valve mechanism is in an interjacent position, the pipe connections from said equalizing tanks to the intake manifold being provided with restricting means for preventing sufficient flow of air into the intake manifold when the brakes are applied to stall the engine, while idling with clutch and gears disengaged operator operated mechanism on the automobile, and operative connections therefrom to the reversing valve mechanism of each of said power actuators for operating the brakes of both vehicles.

10. The combination with an automobile provided with an internal combustion engine for propelling the same, and brake mechanism, and a trailing vehicle connected with the automobile and provided with independent brake mechanism, of a power actuator carried by each of said vehicles, each comprising a power cylinder and piston, operative connections from each of said actuator pistons to the adjacent brake mechanism, means for supplying differential fluid pressures to the actuator cylinder including an equalizing tank for each actuator, and pipe connections therefrom to the intake manifold of the engine, and a reversing valve mechanism for each actuator for connecting the equalizing tank thereof to the cylinder on opposite faces of the piston, and constructed to maintain a balanced condition of the piston when said valve mechanism is in an interjacent position, and adjusting regulating valve interposed between the intake manifold and said equalizing tanks for restricting the flow of air into the intake manifold when the brakes are applied, operator operated mechanism on the automobile, and operative connections therefrom to the reversing valve mechanism of each of said power actuators for operating the brakes of both vehicles.

11. The combination with an automobile provided with an internal combustion engine for propelling the same, and brake mechanism, and a trailing vehicle connected with the automobile and provided with independent brake mechanism, of a power actuator carried by each of said vehicles, each comprising a power cylinder and piston, operative connections from each of said actuator pistons to the adjacent brake mechanism, means for supplying differential fluid pressures to the actuator cylinder, including an equalizing tank for each actuator, and pipe connections therefrom to the intake manifold of the engine, and a reversing valve mechanism for each actuator for connecting the equalizing tank thereof to the cylinder on opposite faces of the piston, and constructed to maintain a balanced condition of the piston when said valve mechanism is in an interjacent position, an adjusting regulating valve interposed between the intake manifold and said equalizing tanks for restricting the flow of air into the intake manifold when the brakes are applied, operator operated mechanism on the automobile connected with the reversing valve mechanism of the power actuator carried thereby, a second operator operated mechanism on the automobile arranged contiguous to the first mentioned operator operated mechanism, and operative connections therefrom to the reversing valve mechanism of the power actuator carried by the trailer, whereby the brakes of the said vehicles may be applied simultaneously or separately, as desired.

12. The combination with an automobile provided with an internal combustion engine for propelling the same, and brake mechanism, and a trailing vehicle adapted to be connected with the automobile and provided with independent brake mechanism, of a power actuator operated by differential pressures, carried by each of said vehicles and connected with the brake mechanism thereof, means for creating differential pressures to operate said actuators, including pipe connections for connecting a part of the engine with said actuators, a reversing valve mechanism for each actuator for controlling said connection, said valve mechanism being constructed to maintain said actuators in a balanced condition when the valve mechanism is in an interjacent position, a pair of operator operated devices on the automobile, located adjacent to each other for simultaneous or separate actuation, and a connection from each of said operator operated devices to the reversing valve mechanism for one of said power actuators.

13. The combination with an automobile provided with an internal combustion engine for propelling the same, brake mechanism carried by said automobile, a trailing vehicle adapted to be connected with the automobile and provided with independent brake mechanism, of a power actuator carried by said trailer and operated on differentials of fluid pressures and connected with the brake mechanism on said trailer, fluid pressure connections from said actuator to the engine of the automobile for providing at least one of said differential pressures, valve mechanism for controlling the differential pressures to said actuator, an operator operated part on the automobile operatively connected with said valve mechanism for controlling said actuator to apply and release said trailer brake mechanism, and a connection from said operator operated part to the brake mechanism of the automobile.

14. The combination with an automobile provided with an internal combuston engine for propelling the same, brake mechanism carried thereby, of a trailing vehicle adapted to be connected to the automobile and provided with independent brake mechanism, a power actuator carried by said trailing vehicle and operated upon differentials of fluid pressure, fluid pressure connections from said power actuator directly to the engine of the automobile for providing at least one of said differential pressures, valve mechanism carried by the trailer for controlling the trailer actuator, an operator operated part operatively connected to said valve mechanism for controlling the same, and a connection from said part to the brake mechanism of the automobile.

15. The combination with an automobile provided with an internal combustion engine for propelling the same, brake mechanism carried thereby, of a trailing vehicle adapted to be connected to the automobile and provided with independent brake mechanism, a power actuator carried by said trailing vehicle and operated upon differentials of fluid pressure, fluid pressure connections from said power actuator directly to the engine of the automobile for providing at least one of said differential pressures, valve mechanism carried by the trailer for controlling the trailer actuator, and an operator operated part carried by the automobile and having a connection with said valve mechanism and with the brake mechanism of the trailer providing lost motion whereby after operating the valve mechanism the operator can apply his physical force to the brake mechanism of the trailer or apply said automobile brake mechanism physically in case of failure of power.

16. The features of claim 13, together with means for flexibly connecting the automobile and trailer, and a flexible element in said fluid pressure connections.

17. In combination with an automotive vehicle and a trailer connected thereto, brake mechanism for each, a power actuator on the automotive vehicle, and a power actuator on the trailer, both operatively connected to the brake mechanisms of said vehicle and trailer, respectively, valve mechanisms for said actuators for controlling differentials of fluid pressure to said actuators, an operator operated part and separate connections from the operator operated part to the brake mechanisms of the vehicle and trailer operatively connected to control the valve mechanisms of said vehicle and trailer actuators, said connections serving to apply the physical force of the operator to said brake mechanisms in addition to the power of the actuators or alone in case of failure of power.

18. The combination with an automobile provided with brake mechanism, of a trailer attached to the automobile and provided with independent brake mechanism, a power actuator on the automobile connected with the brake mechanism thereof, a power actuator on the trailer connected with the brake mechanism thereof, control valve mechanism for each of said actuators adapted to control differential fluid pressures to said actuators, an operator operated part on the automobile, connections from said operator operated part to the brake mechanisms of the automobile and trailer, including a lost motion connection with the valve mechanisms, and means to disconnect one source of differential pressures from the trailer actuator.

In testimony whereof we affix our signatures.

CALEB S. BRAGG.
VICTOR W. KLIESRATH.